United States Patent [19]
Howard

[11] 3,935,026
[45] Jan. 27, 1976

[54] ENERGY CELL FOR WATCH
[75] Inventor: Paul L. Howard, Millington, Md.
[73] Assignee: Timex Corporation, Waterbury, Conn.
[22] Filed: Apr. 14, 1975
[21] Appl. No.: 568,337

[52] U.S. Cl. .................................. 136/20; 136/111
[51] Int. Cl.² ................. H01M 35/02; H01M 43/02
[58] Field of Search ............ 136/20, 111, 107, 137, 136/120 R, 100 R

[56] References Cited
UNITED STATES PATENTS

| | | | |
|---|---|---|---|
| 3,484,295 | 12/1969 | Dawson | 136/100 R |
| 3,650,832 | 3/1972 | Tvarusko | 136/20 X |
| 3,708,343 | 1/1973 | Walsh | 136/133 |

Primary Examiner—Anthony Skapars

[57] ABSTRACT

An energy cell for a wrist watch comprises a silver-zinc button-type cell having a bottom can for the cathode material and a top cap for the anode material mounted thereover with separating means between the anode and cathode materials. The cathode material in the bottom can of the first embodiment is divalent silver oxide mixed with sulfur. This cathode material provides a lower voltage similar to that of the conventional monovalent silver oxide material but has a higher cell capacity. A second embodiment of the invention comprises a cathode material of silver sulfide mixed with divalent silver oxide. This embodiment also retains the higher capacity of the divalent silver oxide while supplying a lower voltage similar to that of the monovalent silver oxide. The anode material in both embodiments is a predetermined zinc amalgam.

8 Claims, 2 Drawing Figures

ENERGY CELL FOR WATCH

BACKGROUND OF THE INVENTION

The present invention relates to energy cells and particularly to energy cells having an improved cathode material.

The prior art includes U.S. Pat. No. 3,484,295 to Dawson, issued Dec. 16, 1969, which discloses a battery having a cathode comprising principal active materials such as divalent silver oxide or sulfur and a secondary masking layer of a material such as monovalent silver oxide. The patent, however, does not disclose the use of a mixture of divalent silver oxide and sulfur to provide a lower voltage, higher capacity energy cell for watch use. U.S. Pat. No. 3,121,028 to Story, which issued Feb. 11, 1964, discloses the use of various sulfur compounds as depolarizers but does not disclose the use of a sulfur and silver oxide mixture as a cathode material.

U.S. Pat. No. 3,615,858 to Luis Soto-Krebs, which issued Oct. 26, 1971, describes a means for achieving a single potential discharge from a multivalent oxide, such as divalent silver oxide by providing a second layer of monovalent silver oxide as an intermediate conductor to give a lower voltage This patent recognizes the problems inherent in using divalent silver oxide as a cathode material. Interestingly, recent U.S. Pat. No. 3,853,623 issued Dec. 10, 1974 to Stuart M. Davis also proposes the use of divalent silver oxide but with a gold additive as a cathode material. The gold additive is intended to improve the stability of the divalent silver oxide. While recognizing the advantageous properties of divalent silver oxide as a cathode material, both Soto-Krebs and Davis are attempting to deal with the compensating negative factors but in a different way than applicant proposes.

Other prior art patents of interest include U.S. Pat. No. 3,057,944 to Ruetschi which issued on Oct. 9, 1962, U.S. Pat. No. 3,716,403 to Braun which issued Feb. 13, 1973, and U.S. Pat. No. 3,716,409 to Cairns which issued Feb. 13, 1973. These patents are not intended to be an all-inclusive listing of pertinent prior art patents but they tend to be representative of the art of interest.

One of the disadvantages of the prior art wherein divalent silver oxide is employed as a cathode material in energy cells is that it produces a higher initial voltage which is unsuitable for use in electrical or electronic watches. The divalent silver oxide also discharges at two distinct potentials as the material is first reduced to monovalent silver oxide and then to metallic silver. The emphasis in the new generation of watches particularly of the quartz crystal variety is on accuracy, and variations in the battery voltage adversely affect the accuracy of thes watches. Consequently, the present invention which provides the higher capacity of divalent silver oxide while supplying the lower voltage of the more stable monovalent silver oxide is a considerable improvement in energy cell design. Another important consideration in electric and electronic watches design is battery life and this requirement is readily met by the energy cell of the present invention.

SUMMARY OF THE INVENTION

The present invention relates to energy cells for wrist watches and particularly to a new and improved silver-zinc button-type cell of the type disclosed in U.S. Pat. 3,708,343 to Walsh which issued Jan. 2, 1974. While utilizing a similar structure to that of U.S. Pat. No. 3,708,343 the cathode material comprises a mixture of divalent silver oxide and sulfur in a first embodiment. Since divalent silver oxide AgO includes a loose oxygen in its makeup, it is possible by means of the present invention to disturb the lattice arrangement thereof to obtain the lower voltage of the more stable monovalent silver oxide $Ag_2O$. Basically, the sulfur is evenly distributed throughout the divalent silver oxide to build up the proper resistance and thereby attain the lower voltage. The cathode mixture, nevertheless, still provides the higher capaicty of the divalent silver oxide which is approximately double that of the monovalent silver oxide. Thus it is possible to obtain a metastable compound without the loss of the higher cell capacity of the divalent silver oxide.

In a second embodiment of the invention, the cathode comprises a mixture of silver sulfide AgS and divalent silver oxide. This mixture functions similar to the first embodiment, providing a higher capacity cell with a predetermined output voltage.

Accordingly, an object of this invention is to provide a new and improved energy cell for wrist watches.

Another object of this invention is to provide a new and improved silver-zinc energy cell of the button-type wherein the cathode material includes a mixture of sulfur and a silver oxide compound.

A further object of this invention is to provide a new and improved energy cell for wrist watches wherein the cathode material is a mixture of divalent silver oxide and either sulfur or silver sulfide selected to provide a lower voltage of constant value and a higher cell capacity than conventional monovalent silver oxide cells.

BRIEF DESCRIPTION OF THE DRAWINGS

Other objects and advantages of this invention may be seen from the following description when viewed in conjunction with the accompanying drawings wherein.

DETAILED DESCRIPTION OF THE INVENTION

Figure 1:
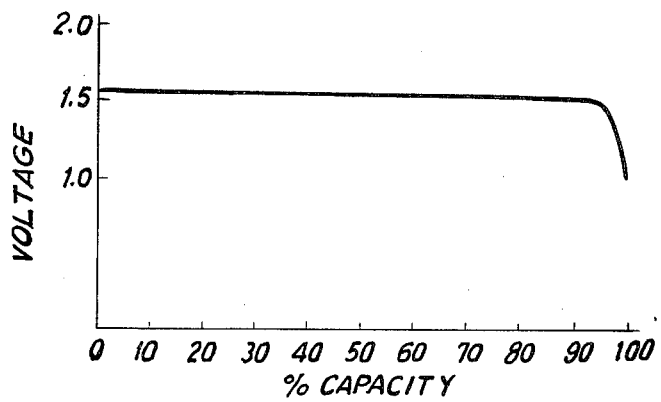
FIG. 1 is a diagrammatic illustration of the voltage profile for the energy cell of the present invention; and, FIG. 2 is a side cross section view of a typical energy cell utilizing the present invention.
Figure 2:
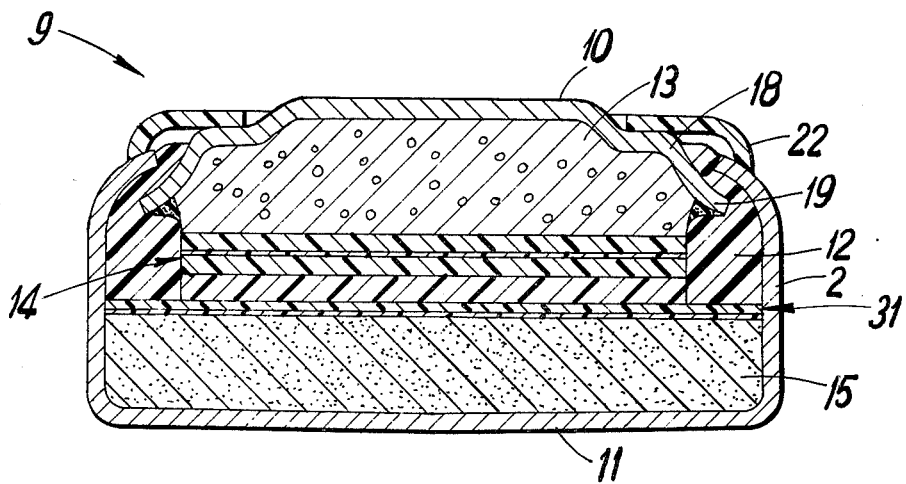

Referring now to the drawings, the invention comprises an energy cell 9 for a wrist watch comprising a top cap 10 and a bottom can 11. The top cap 10 a descending flange 18 and a skirt 19 at the lower end thereof while the bottom can 11 includes a top open end and upwardly extending sides 2. The top cap 10 provides one terminal of the cell, the other terminal being provided by the bottom can 11. An annular grommet 12 is positioned between the top cap 10 and the bottom can 11 and electrically insulates the two terminals of the cell. The top cap 10 contains the anode material 13, which may for example, be a zinc amalgam which is compressed within the top cap 10. The bottom can 11 contains a depolarizing silver cathode material 15 which will be described more fully hereinafter. The anode and cathode materials, 13 and 15 respectively, are separated by one or more barrier layers 31 of a suitable plastic microporous membrane maaterial and separators 14 of absorbent material which also extends under the annular grommet 12. Bibulous separators 14 are positioned between the anode and the cathode. An auxilliary cap 22 of plastic material is later assembled over the top cap 10 to lengthen the leakage path and to serve as an additional seal.

In the first embodiment of the present invention, the cathode material 15 in the bottom can 11 is a mixture of divalent silver oxide and sulfur. This cathode material provides a lower voltage, see FIG. 1, similar to that of monovalent silver oxide material with a higher cell capacity similar to that of the divalent silver oxide. Thus, by adding a predetermined amount of sulfur to the divalent silver oxide in the cathode, it is possible to obtain an output voltage suitable for highly accurate timepieces. The addition of sulfur affects the lattice arrangement of the divalent silver oxide which contains a loose oxygen and adds resistance thereby providing a metastable compound with the prime advantages of the monovalent silver oxide voltage while using divalent silver compounds of a smaller amount for the same capacities as the monovalent cell or increased capacities as required. Since the functioning of silver-zinc cells is well known, the internal reactions of the cell are not described herein.

More specifically, the divalent silver oxide, AgO, and sulfur are intimately mixed either by a pestle-type arrangement or in an agate mill using only agate balls. The AgO is mixed with sulfur in proportions ranging up to 20% sulfur by weight depending on how much the voltage must be initially depressed to maintain a voltage between 1.68 and 1.48 volts throughout the useful life of the battery. The container with the mixture should be vented to prevent a pressure build-up and care must also be taken to keep the temperature from rising over 100°F. Mixing is timed to insure uniform distribution of the sulfur and a slight reduction of the AgO particle size.

The mixture is then compacted into pellets which aare subsequently inserted into the bottom can 11 of the energy cell 9 or the mixture is compacted directly into the can 11 with sufficient pressure to maintain a density between 4.0 and 4.8 gm/cc depending on the desired performance of the energy cell 9. The quantity of the mixture 15 is predetermined to provide the proper can height and a cell capacity which commonly ranges from 150 to 250 mah.

The improved cell 9 of the present invention is intended for use with highly accurate timepieces particularly quartz crystal or solid state type watches where a constant low voltage power source is required. Furthermore, the subject cell 9 meets the design requirement of relatively long life due to its higher cell capacity. FIG. 1 gives a representative voltage profile over 100% capacity discharge for the cell 9. It is noted that the voltage remains constant at approximately 1.54 volts over about 95% of the cell life and then drops off slowly at first and then very rapidly as it reaches 100% of capacity. The cell 9 thus permits accurate functioning of the watch until the cell reaches almost the very end of its useful life.

In an alternative embodiment, the cathode material may comprise a mixture of silver sulfide mixed with divalent silver oxide. This embodiment also retains the higher capacity of the divalent silver oxide while supplying voltage similar to that of the monovalent silver oxide.

As explained above, since divalent silver oxide, AgO, includes a loose oxygen in its makeup, it is possible by means of the present invention to disturb the lattice arrangement by evenly distributing sulfur throughout the divalent silver oxide to obtain the lower constant voltage of the more stable monovalent silver oxide, $Ag_2O$. The cathode mixture, nevertheless, still provides the higher capacity of the divalent silver oxide which is approximately double that of the monovalent silver oxide. It is therefore, possible to obtain a metastable compound without the loss of the higher cell capacity of the divalent silver oxide compound.

While the invention has been explained by a detailed description of specific embodiments, it is understood that various modifications and substitutions can be made in any of them within the scope of the appended claims which are intended also to include equivalents of such embodiments.

What is claimed is:

1. In an energy cell having a positive electrode, a negative electrode and an electrolyte, the improvement comprising:
    a positive active material of said positive electrode consisting essentially of a mixture of divalent silver oxide and up to 20% by weight of a material from the group including sulfur and silver sulfide whereby the voltage level of the divalent silver oxide is depressed to a predetermined level without affecting the cell capacity, said voltage being maintained over substantially the entire life of the cell.

2. An energy cell in accordance with claim 1 wherein:
    the percentage of the material mixed with the divalent silver oxide is selected to depress the cell voltage to a range between 1.68 and 1.48 volts.

3. An energy cell in accordance with claim 1 wherein:
    the mixture of the positive electrode has a predetermined density ranging between 4.0 g/cc and 4.8 g/cc to provide the desired cell performance.

4. An energy cell in accordance with claim 3 wherein:
    the quantity of the mixture comprising the positive electrode is selected to provide a capacity ranging between 150 and 250 mah.

5. An energy cell in accordance with claim 1 wherein:
    the material mixed with the divalent silver oxide is uniformly distributed throughout said mixture and the particle size of the divalent silver oxide is slightly reduced during mixing.

6. An energy cell in accordance with claim 1 wherein:
    the negative electrode comprises a zinc amalgam, and,
    the cell further includes a microporous membrane material separating the negative electrode and the positive electrode.

7. A button-type energy cell comprising:
    a bottom can including a top open end,
    cathode material located in the can-like member comprising a mixture of divalent silver oxide and up to 20% by weight of a material from the group including sulfur and silver sulfide to lower the cell voltage without affecting the capacity of the divalent silver oxide material,
    a cap to receive the anode material having a downwardly extending skirt portion which is positioned in the opening of the can-like member with the can walls swaged thereover,
    anode material comprising a zinc compound mounted in said cap,
    a flexible sealing annular grommet having in a cross section, a flange portion forming a shoulder and an opening extending centrally therethrough,
means for adhering the skirt portion to the shoulder of the grommet, and,
means for separating the anode material from the cathode material in the cell.

8. A button-type energy cell in accordance with claim 7 wherein:
the percentage of the material mixed with the divalent silver oxide is selected to provide a cell voltage of approximately 1.5 volts throughout substantially the entire cell life.

* * * * *